July 12, 1966 W. F. BROWN 3,260,839
SCALE CHANGE PULSE COUNTER
Filed Feb. 13, 1963 4 Sheets-Sheet 3

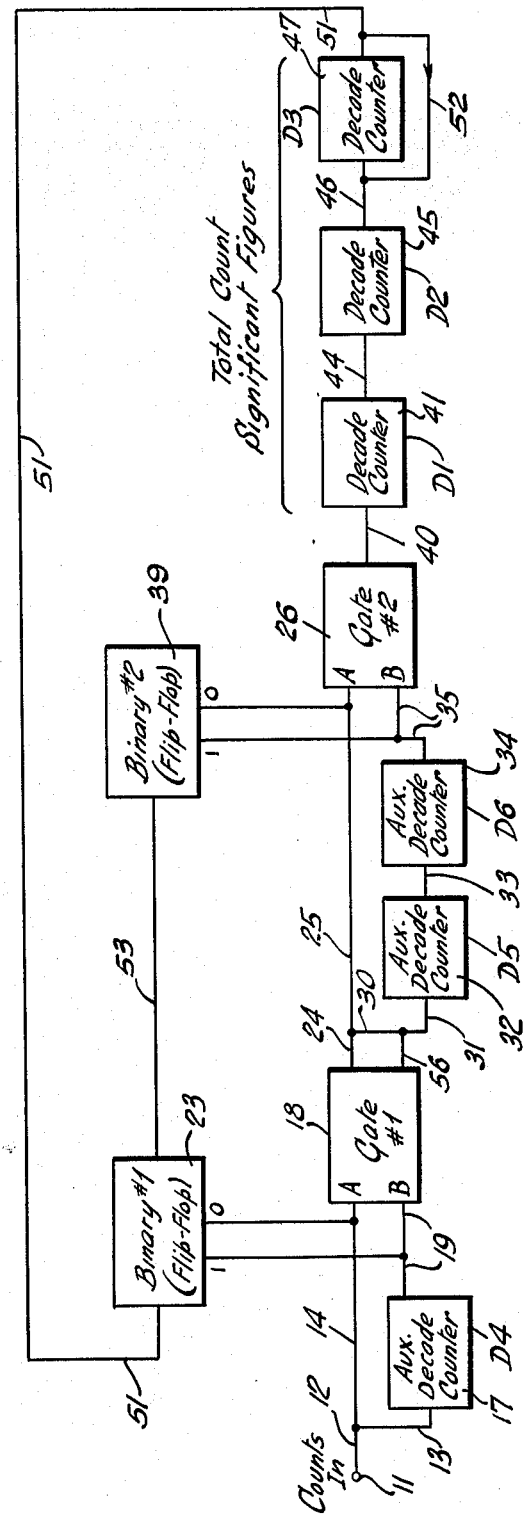

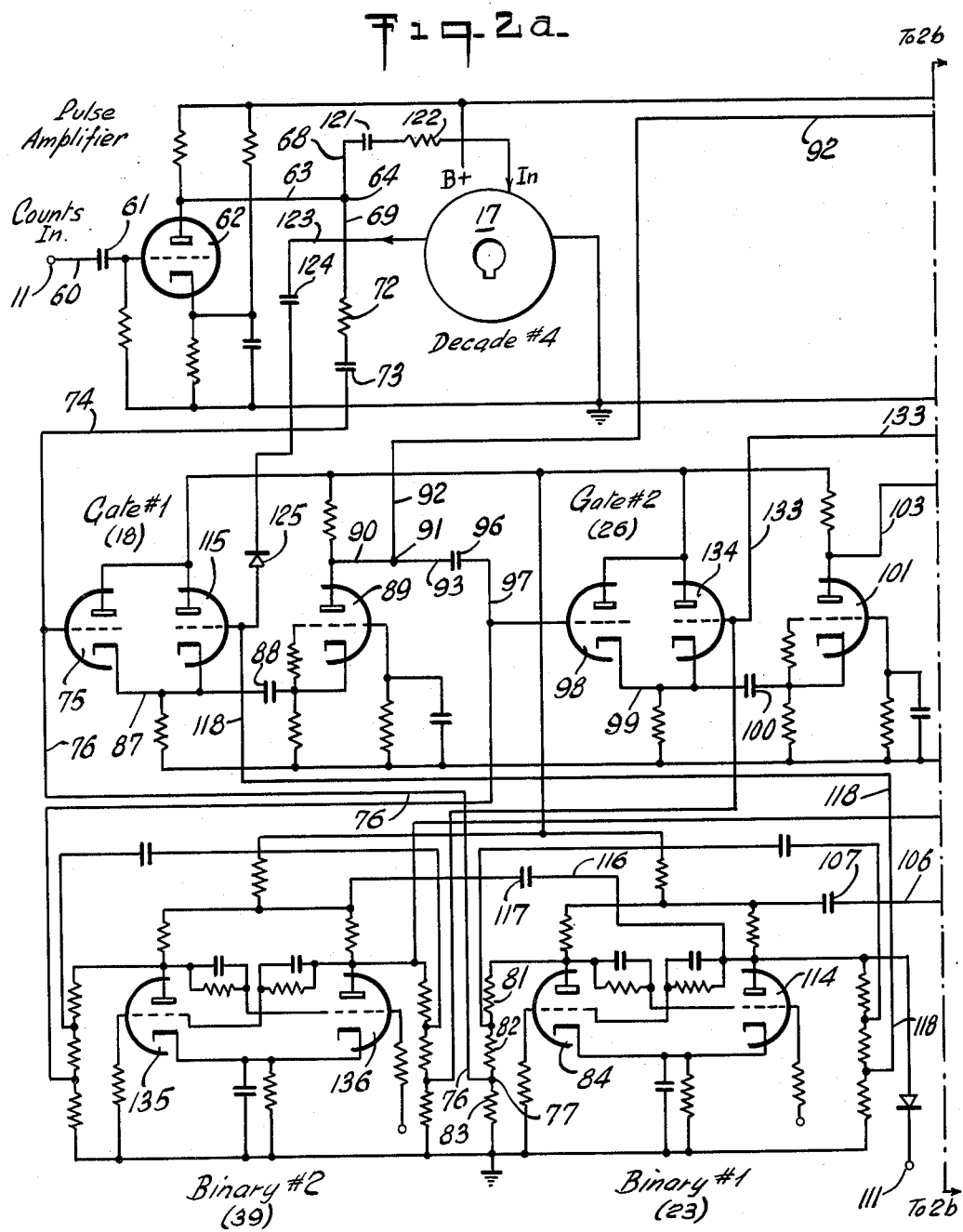

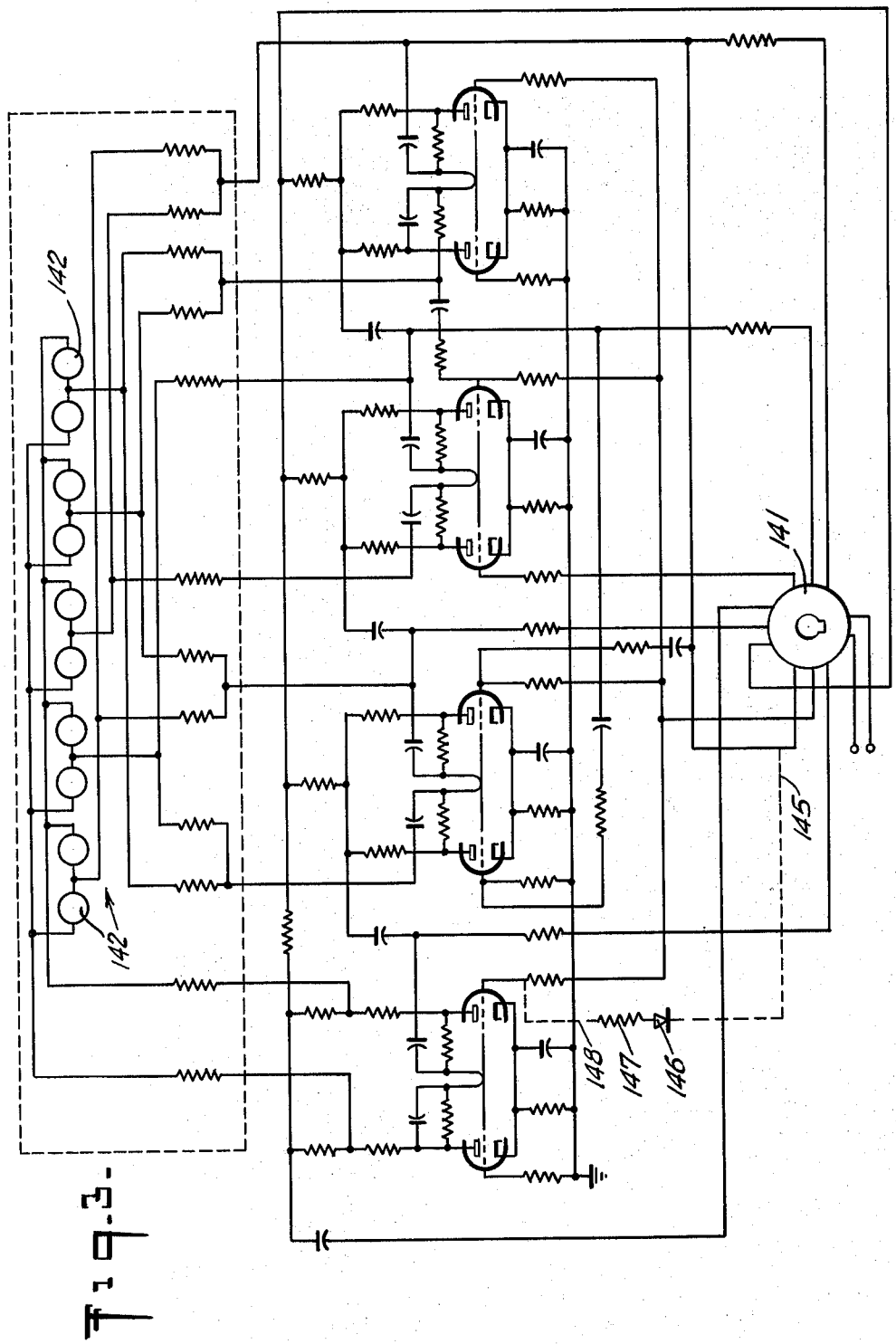

United States Patent Office 3,260,839
Patented July 12, 1966

3,260,839
SCALE CHANGE PULSE COUNTER
William F. Brown, Wappingers Falls, N.Y., assignor to Texaco Inc., New York, N.Y., a corporation of Delaware
Filed Feb. 13, 1963, Ser. No. 258,316
6 Claims. (Cl. 235—92)

This invention concerns digital pulse counters generally, and more specifically relates to a system applicable to digital pulse counting which provides for automatic scale change in order to limit the number of significant figures indicated. It is especially applicable where data is indicated by a series of pulses that are to be counted, and the total count may vary widely in range, e.g., from one to a million.

The invention is applicable to situations where data is presented as a series of voltage pulses which are accumulated in an electronic multidecade counter or scaler, and the total is printed out upon completion of the count. In cases where the total count may vary widely, e.g., from one to a million; it was necessary heretofore to provide wiring and power amplifying devices for print out of each decade even though the significant figures may have been much less than the total number of pulses counted. A system according to this invention automatically changes the scale factor of the counter so that only a prescribed number of significant figures and an exponent are printed.

In application where data is presented as a series of pulses which are accumulated and the total number is printed out upon completion of the count, if the size range of the total count varies widely, the amount of equipment required to print out the total count number may become excessive. Thus, where there is a wide range of total count, but the requirements of accuracy are such that only a limited number of significant figures are required, there will be a substantial reduction in the amount of equipment needed, if a system according to this invention is employed.

In other words, as an example, if the total count expected may vary from one to a million but the requirements are such that only three significant figures are needed, then, only the last three decade counter units which were employed heretofore in printing out the total count, whenever it lay between 100,000 and 999,999, are all that are required to provide three significant figure results. However prior to this invention, in order to count the smaller range numbers as well (with print out thereof) it was necessary to include the three additional lower order decade counters with related auxiliary equipment to count and record the numbers lying between 1 and 99,999. Thus, by means of the subject invention (as will be demonstrated herein) only three decade counters are required to indicate the significant figures desired. And a greatly reduced amount of auxiliary equipment is needed while still recording total counts throughout the entire range of one to a million, with automatic scale change whenever such count changes as to the range thereof.

Consequently, it is an object of this invention to provide a digital counting system having a simplified arrangement for printing out a limited number of significant figures.

Another object of the invention is to provide a system of recording total counts which enables substantial savings in the amount of equipment necessary, by elimination which stems from the use of only a limited number of significant figure output recording of counts. Thus, whenever the accuracy requirements of data involved does not warrant recording by print out of all the figures throughout a wide range, substantial amounts of equipment which would otherwise be included for large total counts, may be eliminated by use of a system according to this invention.

Still another object of this invention is to provide a system for providing automatic scale change, wherein the system has at least one gate with alternate paths therethrough and control for switching the gate paths so as to bypass and accumulate nonsignificant count figures without recording same.

Briefly, the invention relates to a scale change system for a totalizing pulse counter. The said counter is one that has a plurality of decade units one for each significant figure of the total count. In addition the total count involved has a wide range of variation so that the number of significant figures is less than the maximum number of figures of the maximum total count provided for. The system comprises gate means having two paths therethrough, and decade pulse count means having an input thereof connected to receive said pulses and an output thereof connected to one path of said gate means. The system also comprises binary control means for said gate means, and circuit means for actuating said binary control means from the output of the highest order one of said decade units. The latter is arranged so as to cause the said gate means to switch from one of said paths to the other and permit output pulses from said decade pulse count means to pass through said gate means in order to change the scale of the total count indicated.

The foregoing and other objects and benefits of the invention will be more fully explained and clarified in connection with a particular embodiment, which is described in some detail below and which is illustrated in the drawings, in which:

FIGURE 1 is a block diagram illustrating a system according to the invention;

FIGURE 2a is one portion of a schematic circuit diagram illustrating the system of FIGURE 1 in greater detail;

FIGURE 2b is the remaining portion of the schematic circuit diagram of FIGURE 2a; and FIGURE 3 is a schematic circuit diagram illustrating a circuit of a typical one of the decade counter units employed in the system of the invention.

Figure 2B:
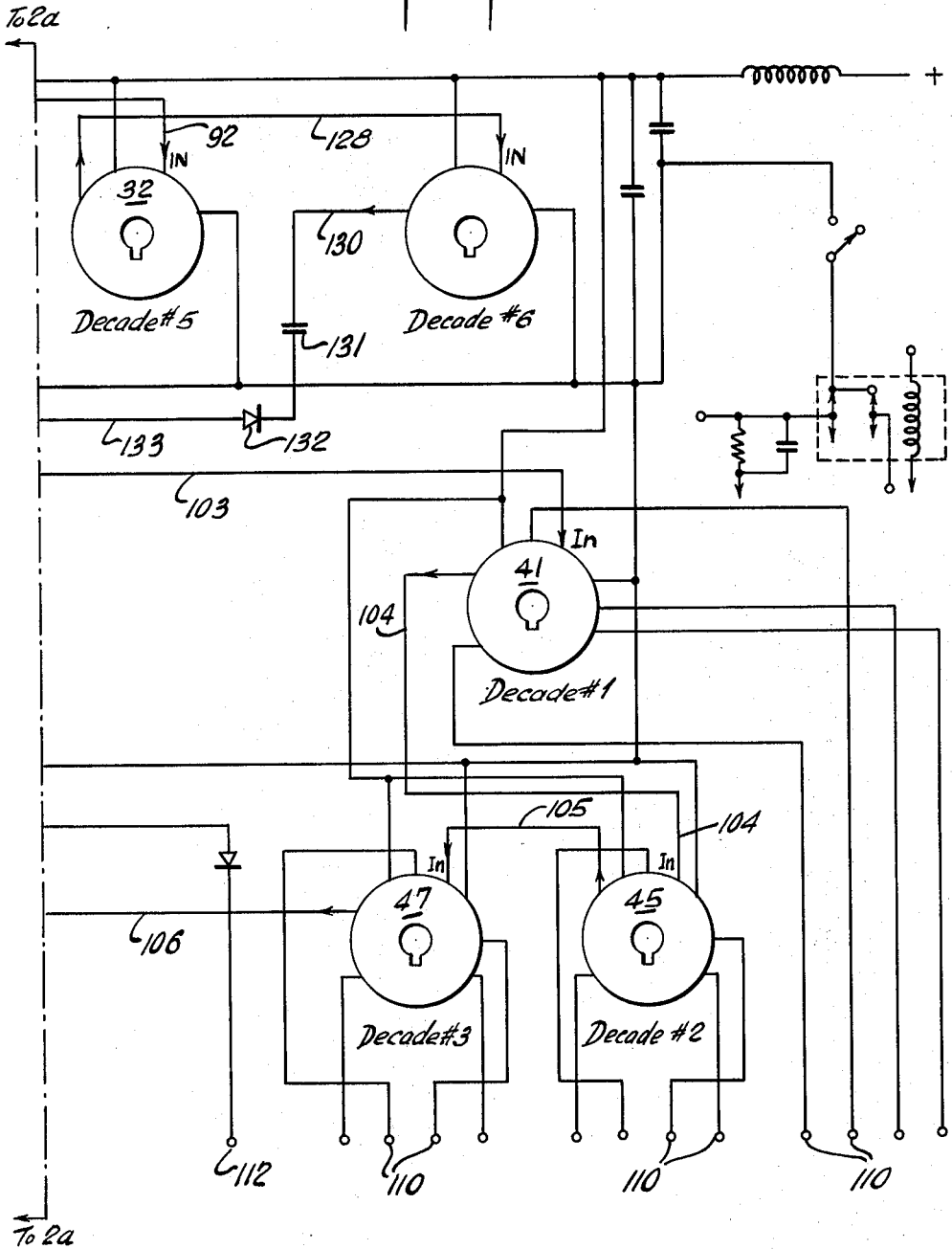

Referring to FIGURE 1, it may be noted that the system which is being described (by way of an example) is one that provides for recording of total counts lying in a range from one to 999,999. There is an input terminal for receiving the pulses of the count, which is marked with the caption "counts in" and has reference number 11 applied thereto. From input terminal 11, are transmitted over a path 12 that divides so that the pulses continue over both paths indicated by lines 13 and 14. These paths carry the pulses to the input of an auxiliary decade counter 17; and a path "A" input of a gate 18 that has the caption "gate #1" applied thereto, respectively. It will be observed that the output of auxiliary decade 17 passes over the path indicated by a line 19 which leads to an alternative path "B" through gate 18.

Gate 18 has alternative paths indicated by the letters "A" and "B." It is controlled, or switched from one path to the other by means of a binary flip-flop 23 that is designated in the drawing as "Binary #1." After the system has been reset to zero, or at the beginning of any given count of input pulses applied to the input 11; binary flip-flop 23 will be in its zero state such that path A through gate 18 is open while path B is closed. Therefore, the pulses will pass through path A of gate 18 and out via path lines 24 and 25 to the path A input of a gate 26 that is captioned "gate #2" in the drawings. At the same time there is a parallel path for the pulses passing through gate 18 and over line 24, to travel via path lines 30 and 31 to the input of a second auxiliary decade counter 32 designated "D5." Counter 32 has the output thereof connected via a path line 33 to another decade counter 34 (designated D6) that has its output connected via a path line 35 to the path B input of gate 26.

Again assuming that the system has been reset and a series of pulses are being counted from one to 999, the condition of another binary flip-flop 39 will be in its zero state such that the gate 26, controlled thereby, has its path A open and its path B closed.

The output path for pulses passing through gate 26 is indicated by a line 40 which leads to the input of a first decade counter 41 (D1). This decade counter has a designation like the others for ease in relating the schematic showing of FIGURE 1 to the more detailed illustrations of FIGURES 2a and 2b.

The output of decade counter 41 is connected via a path line 44 to another decade counter 45 (D2) that follows in cascade from counter 41. Then the path through the system continues with an output from counter 45 via a path line 46 to the input of a third decade counter 47 (D3). The output from counter 47 passes over a path line 51 which leads back to a control input of binary 23.

In addition, there is a feedback circuit illustrated by a path line 52 from the output to the input of decade counter 47. This feedback is employed to reset this highest order counter to "one," for providing the required indications in connection with the significant figure print out of this system; as will be more fully explained below.

It is to be noted that there is an output connection from binary 23 via a path line 53 which leads to an input of binary 39 for control thereof from its zero state to one and back in the usual binary manner, to be explained more fully below.

*Operation of FIGURE 1*

The operation of the illustrative system according to the invention may be described in relation to the elements of FIGURE 1, that have been described above. This description of the operation is intended to clarify and provide a more complete understanding of the invention. A principal one of the benefits of the invention lies in the elimination of substantial amounts of equipment which would be required if the usual prior art arrangement of decade counters were employed to record the total count, especially where the range of such total count may be a very wide one. Thus for example, in the illustrated system there is shown an arrangement to make a record of three significant figures but at the same time provide for accommodating a range of total count from one to 999,999. In prior arrangements, to accommodate such a range, there would be required six decade counter units plus a large amount of related amplifier elements, relays and the increased amount of printer equipment which goes along. In the system according to this invention, a very substantial number of the related amplifier elements, relays and a substantial number of the circuit wires as well as print out equipment may be eliminated. Furthermore, the size of the printer may be reduced to a 4-column unit since only three significant figures plus an exponent need be recorded. Of course, the greater the total count capacity, or the smaller the number of significant figures, the more will be the saving in equipment eliminated.

The operation of the FIGURE 1 system may best be described by following the paths and the action involved as the total number of pulses counted changes in range from one to the next in each of its steps, e.g. from the first step of less than a thousand to the second step of between 1,000 and 10,000 and then similarly from the second step to the third step of between 10,000 and 100,000, and finally from the third step to the fourth step which reaches 999,999.

Commencing at input terminal 11, the first 999 pulses will pass through gate 18—path A since path B of this gate is closed (so that the outputs of auxiliary decade counter 17 are blocked). Similarly, during these first 999 counts the pulses pass out through gate 18 over the path indicated by lines 24 and 25 into and through gate 26 via path A thereof. At the same time those pulses coming through auxiliary counters 32 and 34, are merely blocked at path B (closed) of gate 26. The pulses therefore continue through path 26—path A and over the output path indicated via line 40, to the first (lowest order) of the principal decade counters. The three decade counters, D1, D2 and D3, will receive and count these pulses in a well known manner. Thus, there will be provided one output pulse over line 44 for every tenth input pulse over line 40. Then again at counter 45, every tenth input over line 44 will create an output pulse from counter 45 that will pass over line 46 to the input of the third decade counter 47. Now, when the first output pulse from counter 47 is produced, it represents the number 1,000 of the total pulses being counted (from input terminal 11). This output pulse from counter 47 has a divided path so that in effect a pulse passes back over the path line 52 so as to reset counter 47 to "one," while at the same time a pulse passes via path line 51 to the input of flip-flop 23 so as to cause it to flip over and thus switch gate 18, so that path A is closed and path B is opened.

At this point the system is in the second range of indicating total counts from 1,000 to 9,999. The significant figures are only the first three digits however, and the fact that the count is in the second step range, i.e., 1,000–9,999 is indicated by the state of the binary #1 flip-flop 23 (now in "one" state) while the fact that there has been over a thousand pulses is shown by the "one" state of the highest order decade D3 (47).

During this second step range of counts, because path A of gate 18 is closed, the pulses counted must pass through auxiliary decade counter 17 and consequently only every tenth pulse passes out from counter 17 over line 19 and through gate 18 via path 8. This means that the first digit of the total count number has been dropped, as a nonsignificant figure because there is no print out connection to any of the auxiliary counters 17, 32 and 34.

The count of every tenth pulse will continue by passage of these pulses over path B of gate 18 and out via a path line 56 to the lines 30, 25 (as well as the line 31). However, at this time gate 26 remains in its original state (path A open and path B closed) so that the pulses over line 31 and via auxiliary counters 32 and 34, will be blocked while the pulses over lines 30 and 25 will pass through gate 26 (path A) and on over output line 40 into the cascaded series of recording counters 41, 45 and 47.

The next shift of range will take place as the total count reaches 10,000, when there will be another output pulse from decade counter 47 which will again reset this counter from "nine" to "one" while providing an input pulse to binary 23. This will cause binary #1 (23) to flop back to the original "zero" state and simultaneously provide an output pulse over path line 53 to the flip-flop 39 (binary #2) causing it to flip to its other ("one") position and thus switch gate 26 from path A open to path B open and path A closed. It will be noted that the state of binary 23 causes gate 18 to be switched back from path B open to path A open once more.

Now, during this third range the pulses being counted will pass via path A of gate 18 and then out via lines 24, 30 and 31 into the cascaded pair of auxiliary decade counters 32 and 34 so that only every one hundreds pulse will pass out from counter 34 over path line 35 and through now open path B of gate 26. These pulses will, of course, then travel over line 40 into the cascaded series of recording counters 41, 45 and 47. In this range the first two digits of the total count will be nonsignificant figures, and the total count range will lie between 10,000 and 99,999. The fact that the count is in this range will be indicated by the "one" state of binary #2 (flip flop 39).

Finally the fourth range of total count will be that where the pulses counted are from 100,000 to 999,999, and in this range the system will have automatically shifted once more to again have flipped binary 23 to its "one" state. Thus gate 18 will have been switched from path A open to path B open, while gate 26 will remain with its path B open as in the previous range, since no output pulse is created by binary 23 as it flips from state "0" to state "1." Therefore the pulses from input 11 will pass over paths 12 and 13 through the auxiliary decade counter 17 so that only every 10th pulse will go through path B of gate 18 and on via lines 56 and 31 into the cascaded pair of auxiliary counters 32 and 34. Thus, only every one hundredth of the output pulses from decade counter 17, i.e., every 1,000th of the input pulses at input 11, will pass over line 35 and through gate path B of gate 26 and into the cascaded series of recording decade counters 41, 45 and 47.

If the one millionth pulse should be reached it would reset the entire system to zero except for counter 47 indicating a "one;" and since this is the limit of the capacity for the illustrated system it will be clear that should there be any expectation of total counts of a million or more, there must be additional provisions made. It will be clear that the same principles apply to any expanded system for additional total count capacity as is the case in connection with the illustrated system.

FIGURES 2a and 2b

Referring to FIGURES 2a and 2b, a more detailed description will be provided relating to a schematic circuit diagram. Wherever the elements illustrated in FIGURES 2a and 2b correspond with those shown in FIGURE 1, the same reference numerals are applied.

Commencing at input terminal 11 (FIGURE 2a), the pulses to be counted are introduced here. It is to be understood that the system illustrated and described is applicable to pulses in the nature of voltage signals. Therefore the incoming pulses are transmitted via a circuit wire 60 and a capacitor 61 to the grid circuit of an electron tube 62. Tube 62 acts as a pulse amplifier (as indicated by the caption) and the amplified signals are transmitted via a circuit wire 63 to a common junction point 64. Here the signal path divides and the pulses are transmitted via both of the circuit wires 68 and 69 which correspond to the path lines 14 and 13, respectively, of the FIGURE 1 diagram.

Continuing to trace the signal paths on FIGURE 2, beginning first with the pair of signals when the system is in its starting condition, i.e., after it has been reset to commence a given totalizing count, the path of the signals via the circuit wire 69 will be traced. Thus, the signals continue via a resistor 72 and a capacitor 73 to a circuit wire 74 that is connected to the grid circuit of an electron tube 75. Tube 75 is the "A" path side of gate number one, i.e., gate 18 of the FIGURE 1 showing. This path A of gate one is open, by reason of the fact that there is a normal bias voltage applied. Such bias voltage is applied via a circuit wire 76 that leads to a point 77 on a voltage divider formed by three resistors 81, 82 and 83, connected as illustrated. It will be observed that this voltage divider is connected across the plate circuit of an electron tube 84 which is the left hand one of a flip flop pair of tubes that go to make up the binary flip flop number one, which has the reference number 23 applied thereto in the FIGURE 1 system.

Returning to the path of transmission of voltage pulses that are being counted, the output circuit from tube 75 of gate number one is via a cathode follower circuit which includes a cathode circuit wire 87 and a capacitor 88 and leads to the grid circuit of a buffer amplifier tube 89. The output circuit from tube 89 continues via a circuit wire 90 to a junction point 91 where there is again a division so that the signal may travel both over circuit wire 92 and a circuit wire 93. The latter two circuit wires represent the path lines 30 and 25 respectively of the FIGURE 1 showing.

To continue with the path of signal travel when the system is in the initial, or step one state of the circuit, the signals are carried from the junction point 91 via the circuit wire 93 and a capacitor 96 and another circuit wire 97 to the grid circuit of an electron tube 98. Tube 98 is the path A side of gate number two which was illustrated in FIGURE 1 by the block carrying reference number 26. Thus, the signals continue via a cathode follower circuit from tube 98, over a circuit wire 99 and a capacitor 100 to the grid circuit of another buffer amplifier tube 101. The output from tube 101 goes via a circuit wire 103 (FIGURE 2a and FIGURE 2b) to the input of decade counter unit 41. It will be noted that whereas the counter 41 is illustrated in FIGURE 1 by a block showing, in FIGURE 2b it is indicated by a symbol representing a keyed connector socket. The details of the decade counter unit are old and well known and form no part per se of this invention.

The action of the decade counter unit is such as to accept, and indicate (if desired) the number of pulses from one to nine followed by the passing on of an output pulse simultaneously with resetting the unit to zero count, upon receipt of the tenth pulse. Thus, in a standard manner, every tenth pulse received by the decade counter 41 is transmitted over a circuit wire 104 to the input of the second decade counter unit 45. Then once more, every tenth one of the input pulses to counter 45 is transmitted on via a circuit wire 105 to the input of the third decade counter unit 47. Finally, the output from counter unit 47 is connected via a circuit wire 106 (FIGURES 2b and 2a) back to the binary number one flip-flop 23 via a capacitor 107.

It will be understood that the series of three decade counter units 41, 45 and 47 are connected to a print out system (not shown) so that at the completion of a given total count, the indications of these three counters may be permanently recorded by actuating the print out equipment in accordance with the count then stored by the counters. Some of the additional circuits required in connection with this print out aspect of the recording of total count, are illustrated by way of a general indication of the manner in which such connections are made. Thus, there are circuit connections shown terminating at a plurality of terminals 110 which are illustrated at the lower portion of FIGURE 2b. In addition there are connections from the binary flip flops 23 and 39, shown ending at terminals 111 (FIGURE 2a) and 112 (FIGURE 2b), respectively. These latter terminals are for connecting a print-out to show the exponent with the significant figures. It is to be understood that these circuit connections and the equipment to which they lead, are well known and will be clearly understood by anyone skilled in the art.

Returning to the circuit from the output of decade counter unit 47, it will be observed that this output is applied via the above mentioned wire 106 and capacitor 107 to the binary flip-flop element that is made up of the tube 84 cross connected in a standard manner with another tube 114. Arrival of this pulse signal over this path will flip the binary pair from its first, or "zero" state to its other, or "one" state. Thereafter subsequent pulses will flip this "binary #1" pair back and forth alternatively, which another circuit wire 116 and a capacitor 117 make a connection from the "output" of binary #1 (flip-flop 23) to an input of "binary #2" which corresponds with path line 53 of the FIGURE 1 showing.

As pointed out above, the switching control of the gates 18 and 26 is carried out by the binary flop-flops 23 and 39, respectively. An understanding of how this is done will be readily had with reference to the signal paths already described on FIGURE 2a. During the first step range of operation, the gate 18 is set with its path A open. This is accomplished by having tube 75 biased for passage of signals therethrough. This, in turn, is determined by the conducting or non-conducting state of tube 84 that has the voltage divider containing resistors 81, 82 and 83 connected thereacross. During the second step range of operation the gate 18 is switched to the alternative state with its path B open. This is accomplished by having tube 75 cut off by having a negative bias applied thereto while path B (through gate #1) is opened by removal of a cut off bias from the other tube 115 and by having a normal bias applied thereto. The foregoing is accomplished by changing the state of flip flop tubes 84 and 114 from that where one is conducting with the other cut off and vice versa.

In other words, a negative cut off bias voltage to tube 115 is applied via a circuit wire 118 when tube 114 is conducting. This is when binary #1 (flip flop 23) is in its "zero" state so that gate #1 (18) has its path A open. Then when the flip-flop 23 goes to its "one" state, the control of gate 18 is actuated to switch over to path B open. This means that bias conditions are switched so that the bias voltage on tube 115 will be switched to a normal bias voltage created when the tube 114 is cut off, because this effectively raises the voltage applied from the voltage divider via connector wire 118. It will be noted that this is the reverse of the bias voltage application with respect to tube 75 of gate #1, because it is controlled by the circuit connector wire 76 that leads to the voltage divider related to the other tube 84 of the binary.

It will be observed that the actions created in connection with shifting range are related to the output signal from decade counter 47 in each case. Thus, every time the three decade counter units 41, 45 and 47 have all become filled so that receipt of the next pulse resets them and produces an output pulse from unit 47, the control action is such as to switch the gate or gates under control of the binary flip flop elements to cause scale change action generally described in connection with the block diagram of FIGURE 1. Thus, it is not deemed necessary to trace the signal path for each of the various scale settings in detail on the FIGURES 2a and 2b showings. It will be sufficient to note that in the first step range of counting signals there is a divided path indicated above which commences at the junction point 64. Now the signals which are applied to circuit wire 68 will be transmitted via a capacitor 121 and a resistor 122 to the input of the auxiliary decade counter 17. Then the output pulses from the counter (D4) pass via a circuit wire 123 and a capacitor 124, as well as a diode 125, only to be blocked at the input circuit of tube 115 of gate #1, since this tube is biased beyond cut off.

However, when the gate #1 has been switched over, then the output signals from auxiliary decade 17 will pass by the path B side, i.e., tube 115. These signals will then be transmitted via the buffer amplifier 89 and the rest of the path described above, through the remainder of the system.

In a similar manner, when the additional range steps of total pulse count are reached, the switching of gate #2 will be carried out so as to include the signal path that is illustrated from the junction or common point 91 (at the output side of buffer amplifier tube 89) and goes via circuit connector 92 to the input of the first auxiliary decade unit 32. Auxiliary unit 32 has its output connected to the input of the other auxiliary decade unit 34 via a circuit wire 128. Then the output circuit for the pulses that pass through these two counters includes a circuit connector wire 130 and a capacitor 131 in addition to a diode 132. The circuit is completed via a connector wire 133 to the B path of gate #2 which is an electron tube 134.

Control of the gate #2 is carried out by the flip flop binary #2 (39) which is made up of a cross connected pair of tubes 135 and 136 as is the case with the flip flop pair 84 and 114 of binary #1. Thus, it is clear that the same type bias control connections are carried from corresponding voltage divider circuits which are related to the tubes 135 and 136. Furthermore, these bias connections control gate #2. Consequently, no more detailed description of the control action is deemed necessary.

*Typical counter circuit*

As has been indicated previously, a decade counter unit per se is well known, and as employed in the system according to this invention it might take various forms. However, it is preferred to use a unit in accordance with a typical decade counter circuit that is illustrated in FIGURE 3. This typical counter unit may be purchased as a commercially available item from Computer-Measurements Corporation of North Hollywood, California. Furthermore, an explanation of the manner of operation thereof is readily available from the foregoing company, in connection with their instruction manual relating to the Model 100, 105, 120 and 125 series of decade counting unit. Consequently, no detailed description of the circuit or an explanation with respect to the illustrated typical unit shown in FIGURE 3, is deemed necessary.

It may be observed, however, that the circuit connections are carried to a key oriented connector socket 141 and that the locations of the various circuits, e.g., the input and output connections, correspond with those indicated relative to the corresponding key socket symbol showings of FIGURE 2. Furthermore, there is optionally included in each decade counter unit a plurality of ten neon light indicators 142 that provide a visual showing indicative of the pulse count from one to ten (zero). Briefly, the basic arrangement of the decade unit is made up of four binary pairs of flip-flop circuits with feed back connections made in the necessary manner so as to provide individual output voltages that represent the ten different states of the entire system which corresponds to the number of input pulses received in any given series. Also, it is pointed out that the operation is such, insofar as the input and output of the entire decade counter unit is concerned, that the first nine input pulses merely create internal changes (and corresponding neon light indications at the indicators 142) while the tenth pulse resets the entire unit to zero and simultaneously provides a single output pulse therefrom. Thus, every tenth pulse applied to the input circuit is passed along as an output pulse from the unit.

It is to be particularly noted in connection with FIGURE 3, that there is shown in dashed lines a feed back circuit. This corresponds to that illustrated by path line 52 of FIGURE 1, so that this dashed line circuit connection is made only to the decade counter unit 47 of the entire system according to this invention. As already pointed out above the purpose of this feed back connection is to reset the counter to "one" rather than zero, following an output pulse from the unit. This reset to "one" action is created by adding to the counter unit 47 a circuit connection which goes from the output of the counter unit via a connector wire 145. Wire 145 leads to a diode 146 and the connection continues via a resistor 147 and from there via a connector wire 148 to the right hand tube of the first binary pair of the counter unit. The action of this feed back path will be just as that already indicated, merely that of resetting the counter unit (that has this feed back connection) to "one" each time there is an output pulse from the unit, rather than resulting in the unit indicating "zero" as would be the case otherwise. The purpose of thus resetting counter unit 47, is merely that of maintaining the proper indications in connection with the higher scale settings of the entire system, i.e., whenever the total count has gone above 999.

The extension of the concept of this invention to higher counter capacity will be clear. Thus, additional binaries and auxiliary decades must be provided and connected in a binary manner. For example: transmission through gate one is direct or through one decade counter; through gate two it is direct or through two decade counters; through gate three it is direct or through four decade counters; through gate four it is direct or through eight decade counters, etc.

It has been found that by reason of employing a system according to this invention very substantial savings in the amount of auxiliary equipment required may be had. While this has been already generally indicated heretofore, some specific data with respect to the economies that may be achieved in connection with a unit according to the particular system illustrated herein, is as follows.

Total equipment for print-out 3 significant figures+exponent:
    4 column printer
    14 buffer amplifiers
    14 relays
    30 wires to printer
    2 binary counters
    2 double gates Total equipment for print-out 6 decades:
    6 column printer
    24 buffer amplifiers
    24 relays
    54 wires to printer While the foregoing description of the invention has been set forth in considerable detail in accordance with the applicable statutes, this is not to be taken as in any way limiting the invention but merely as being descriptive thereof.

I claim:
1. A scale change system for a totalizing pulse counter, said counter having a plurality of decade units one for each significant figure of the total count and said total count having a wide range of variation so that the number of significant figures is less than the maximum number of figures of the maximum total count provided for, comprising gate means having two paths therethrough, decade pulse count means having an input thereof connected to receive said pulses and an output thereof connected to one path of said gate means, binary control means for said gate means, and circuit means for actuating said binary control means from the output of the highest order one of said decade units to cause said gate means to switch from one of said paths to the other and permit output pulses from said pulse count means to pass through said gate means in order to change the scale of the total count indicated.

2. A scale change system according to claim 1 further including a second gate means having two paths therethrough, second and third decade pulse count means connected in cascade and having an input thereof connected to both paths of said first gate means and an output connected to one path of said second gate means, second binary control means for said second gate means, and circuit means connecting said second binary control means to said first binary control means for actuation of the second control means only upon return of said first binary control means to its original state.

3. A scale change system according to claim 1 wherein said two paths through the gate means are open in the alternative.

4. A scale change system according to claim 3 wherein said binary control means comprises a flip flop circuit.

5. A scale change system according to claim 2 wherein said two paths through each of said gate means are open in the alternative.

6. A scale change system according to claim 5 wherein each of said binary control means comprises a flip flop circuit.

No references cited.

DARYL W. COOK, *Acting Primary Examiner.*

J. F. MILLER, *Assistant Examiner.*